US012617874B2

(12) United States Patent
Jiang et al.

(10) Patent No.: US 12,617,874 B2
(45) Date of Patent: *May 5, 2026

(54) CYCLODEXTRIN-POLYOXOMETALATE IONIC LIQUID INCLUSION COMPLEX FLAME RETARDANT ADDITIVE FOR MAKING A LOW SMOKE ZERO HALOGEN COMPOUND

(71) Applicant: CORNING INCORPORATED, Corning, NY (US)

(72) Inventors: Dayue Jiang, Painted Post, NY (US); Kevin Andrew Vasilakos, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 18/199,436

(22) Filed: May 19, 2023

(65) Prior Publication Data

US 2023/0323210 A1      Oct. 12, 2023

Related U.S. Application Data

(60) Division of application No. 16/776,555, filed on Jan. 30, 2020, now Pat. No. 11,667,846, which is a
(Continued)

(51) Int. Cl.
*C08L 23/06*          (2006.01)
*C08B 37/16*          (2006.01)
(Continued)

(52) U.S. Cl.
CPC .......... *C08B 37/0015* (2013.01); *C08L 23/06* (2013.01); *C08L 23/12* (2013.01);
(Continued)

(58) Field of Classification Search
None
See application file for complete search history.

(56) References Cited

U.S. PATENT DOCUMENTS

| | | | | |
|---|---|---|---|---|
| 10,759,922 B2 * | 9/2020 | Jiang | .................... | C08K 5/5399 |
| 10,975,226 B2 * | 4/2021 | Jiang | .................... | C08K 5/5399 |
| 2011/0073331 A1 | 3/2011 | Xu | | |

FOREIGN PATENT DOCUMENTS

| | | |
|---|---|---|
| CN | 101967281 A | 2/2011 |
| CN | 103421241 A | 12/2013 |

(Continued)

OTHER PUBLICATIONS

Alongi et al; "Novel Flame Retardants Containing Cyclodextrin Nanosponges and Phosphorus Compounds to Enhance Eva Combustion Properties"; Polymer Degradation and Stability; vol. 95, No. 10, pp. 2093-2100, (2010).

(Continued)

*Primary Examiner* — Richard A. Huhn
(74) *Attorney, Agent, or Firm* — Thomas R. Irwin

(57)          ABSTRACT

Embodiments of a flame retardant compound are provided. The flame retardant compound includes a polymer base resin and a flame retardant additive distributed within the polymer base resin. The flame retardant additive includes inclusion complexes that are made of at least one guest molecule and at least one carbonific host molecule. The at least one guest molecules is a polyoxometalate ionic liquid. The flame retardant compound achieves a limiting oxygen index of at least 25% according to ISO 4589. Additionally, embodiments of a flame retardant cable are provided that utilize the flame retardant compound as a jacketing material.

15 Claims, 7 Drawing Sheets

Related U.S. Application Data continuation of application No. PCT/US2018/044339, filed on Jul. 30, 2018.

(60) Provisional application No. 62/539,765, filed on Aug. 1, 2017.

(51) Int. Cl.

| | |
|---|---|
| *C08K 3/11* | (2018.01) |
| *C08L 23/12* | (2006.01) |
| *C09K 21/14* | (2006.01) |
| *G02B 6/44* | (2006.01) |
| C08K 3/22 | (2006.01) |

(52) U.S. Cl.
CPC ............ *C09K 21/14* (2013.01); *G02B 6/4436* (2013.01); *C08K 3/11* (2018.01); *C08K 2003/2255* (2013.01); *C08L 2201/02* (2013.01)

(56) References Cited

FOREIGN PATENT DOCUMENTS

| | | | | |
|---|---|---|---|---|
| CN | 103435844 A | * | 12/2013 | |
| WO | 2015/062257 A1 | | 5/2015 | |
| WO | WO-2017087115 A1 | * | 5/2017 | .......... C08L 23/0853 |
| WO | 2017/205130 A1 | | 11/2017 | |

OTHER PUBLICATIONS

Braga et al; "Encapsulation of Half-Sandwich Complexes of Molybdenum With-Cyclodextrin" ; J. Chem. Soc.; pp. 2964-2968 (2000.

Chen et al; "Increasing the Efficiency of Intumescent Flame Retardant Polypropylene Catalyzed by Polyoxometalate Based Ionic Liquid"; J. Mater. Chem. A; 1; 48; pp. 15242-15246; (2013.

Chen et al; "Roles of Anion of Polyoxometalate-Based Ionic Liquids in Properties of Intumescent Flame Retardant Polypropylene"; Rsc Adv. 4; pp. 32902-32913 (2014.

European Patent Application No. 18762653.6 Communication pursuant to Article 94(3) EPC dated Dec. 23, 2022; 6 Pages; European Patent Office.

International Search Report and Written Opinion of the International Searching Authority; PCT/US2018/044339; Mailed Nov. 9, 2018; 6 Pages; European Patent Office.

Lai et al; "Synergistic Effect of Phosphorus-Contianing Montmorillonite With Intumescent Flame Retardant in Polypropylene" Journal of Macromolecular Science, Part B: Physics; 51; pp. 1186-1198; (2012).

Lima et al; "Interactions of Cationic and Neutral Molybdenum Complexes With-Cyclodextrin Host Molecules"; Organometallics; 20; pp. 2191-2197 (2001.

Liu et al; "Catalytic Action of Phospho-Tungstic Acid in the Synthesis of Melamine Salts of Pentaerythritol Phosphate and Their Synergistic Effects in Flame Retarded Polypropylene"; Polym. Degrad. Stab., 91(10), 2513-2519., (2006); DOI:10.1016/j.polymdegradstab.2006.03.009.

Patil et al; "Inclusion Complex System; a Novel Technique to Improve the Solubility and Bioavailability of Poorly Soluble Drugs: a Review"; Internaitonal Journal of Pharmaceutical Sciences Review and Research; Voiume 2, Issue 2, pp. 29-34 (2010).

Shao et al; "Increased Water Solubiity of Molybdenum Trioxide Induced by-Cyclodextrin"; Acta Phys.—Chim. Sin .; 29; (3) pp. 460-466 (2013) http://www.whxb.pku.edu.cn/EN/abstracl/abstract28339shtml.

Wikipedia "Cyclodextrin"; 6 Pages; Last Updated 2020.

Wikipedia "Ionic Liquid"; 12 Pages; Last Updated 2020.

Wikipedia "Low Smoke Zero Halogen"; 2 Pages; Last Updated 2020.

Wikipedia; "Inclusion Compound"; 2 Pages; Last Updated 2019.

Wikipedia; "Polyoxometalate"; 6 Pages; Last Updated 2020.

* cited by examiner

CYCLODEXTRIN-POLYOXOMETALATE IONIC LIQUID INCLUSION COMPLEX FLAME RETARDANT ADDITIVE FOR MAKING A LOW SMOKE ZERO HALOGEN COMPOUND

CROSS REFERENCE TO RELATED APPLICATIONS

This application is a divisional of U.S. patent application Ser. No. 16/776,555 filed Jan. 30, 2020, now U.S. Pat. No. 11,667,846, which is continuation of International Application No. PCT/US2018/044339 filed Jul. 30, 2018, which claims the benefit of priority of U.S. Provisional Application Ser. No. 62/539,765, filed Aug. 1, 2017, the content of which is relied upon and incorporated herein by reference in its entirety.

BACKGROUND

The disclosure relates generally to flame retardant compounds and more particularly to a thermoplastic flame retardant compound. Flame retardant materials are used to protect combustible materials, such as plastics or wood, from fire damage and heat. Additionally, flame retardant materials have been used to protect materials that lose their strength when exposed to high temperatures, such as steel.

SUMMARY

In one aspect, embodiments of a flame retardant compound are provided. The flame retardant compound includes a polymer base resin and a flame retardant additive distributed within the polymer base resin. The flame retardant additive includes inclusion complexes that are made of at least one guest molecule and at least one carbonific host molecule. The at least one guest molecules is a polyoxometalate ionic liquid. The flame retardant compound achieves a limiting oxygen index of at least 25% according to ISO 4589.

In another aspect, embodiments of a flame retardant cable are provided. The flame retardant cable includes at least one communication element and a polymeric jacket that surrounds the at least one communication element. The polymeric jacket is formed from a flame retardant compound that includes a polymer base resin and a flame retardant additive distributed within the polymer base resin. The flame retardant additive includes inclusion complexes that are formed of at least one guest molecule and at least one carbonific host molecule. Each of the at least one guest molecules is a polyoxometalate ionic liquid.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIGS. 4A-4B depict a $\gamma$-cyclodextrin host molecule according to an exemplary embodiment;

DETAILED DESCRIPTION

Referring generally to the figures, various embodiments of a low-smoke, zero halogen (LSZH) flame retardant compound and its applications are shown. In general, the embodiments discussed herein relate to a thermoplastic compound comprised of a polymer, such as a polyolefin homopolymer or copolymer base resin, and an LSZH flame retardant additive. The LSZH flame retardant additive includes a carbon source. More specifically, the carbon source is, at least in part, in the form of inclusion complexes in which each inclusion complex has one or more host molecules and a guest molecule. The host molecule is a carbonific molecule, and the guest molecule is an ionic liquid (IL) modified polyoxometalate (POM), or as used herein, a polyoxometalate ionic liquid (PIL). The inclusion complex is part of an LSZH flame retardant additive that can be added to various thermoplastic resins to provide a thermoplastic LSZH flame retardant compound. The host and guest molecules interact physically at the molecular level, such that each host molecule is part of a complex with a guest molecule. Thus, during the compounding process of a thermoplastic LSZH fire retardant compound, the host molecules are advantageously able to resist aggregating with the other host molecules, and the guest molecules are advantageously able to resist aggregating with the other guest molecules. By maintaining an even distribution of inclusion complexes within the compounded resin, the host and guest molecules are able to react rapidly and uniformly with the rest of the LSZH flame retardant additive throughout the thermoplastic compound, providing enhanced flame retardant performance.

Figure 1:
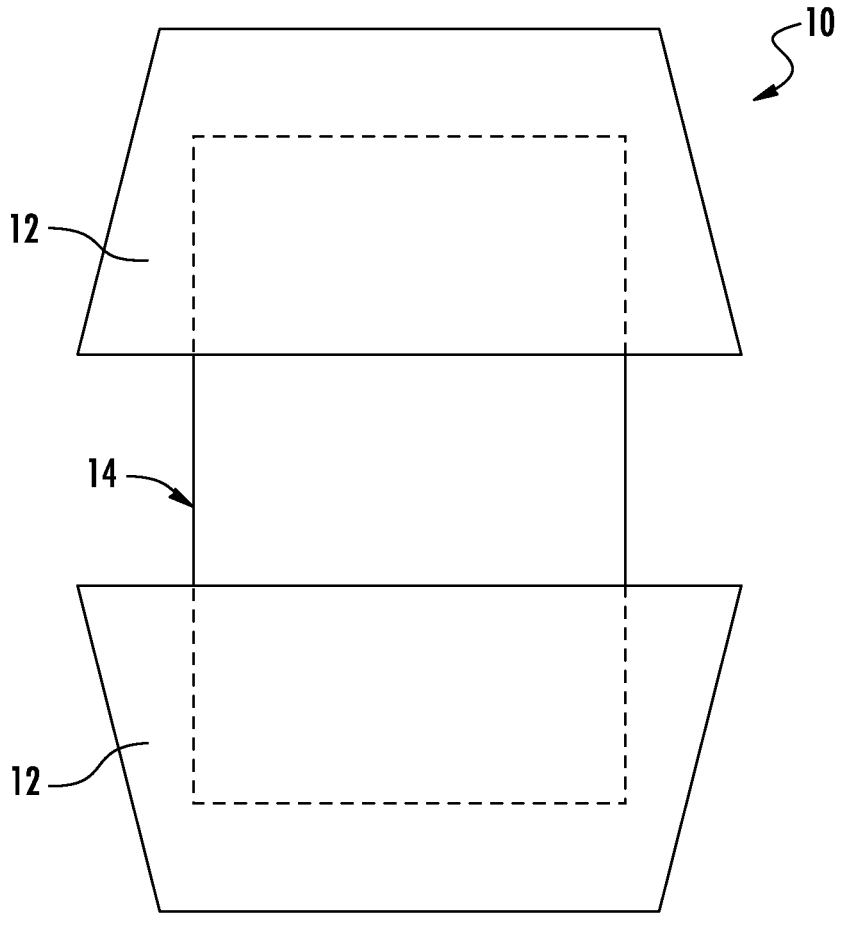
FIG. 1 depicts a schematic representation of a flame retardant inclusion complex according to an exemplary embodiment.

FIG. 1 schematically depicts an inclusion complex 10 in which the host molecule 12 is one or more carbonific molecules and in which the guest molecule 14 is one or more PIL. The formation of an inclusion complex 10 assures that each carbonific host molecule 12 is provided with a PIL guest molecule 14 in close physical proximity, thereby enhancing the speed and efficiency of the charring process.

The molecules of the inclusion complex 10 are held together by forces other than covalent bonding, which means that the inclusion complex 10 is a physical association, not a chemical reaction. The host molecule 12 has an open structure such that the guest molecule 14 can be inserted into the host molecule 12. In embodiments, the host molecule 12 and the guest molecule 14 are held together through hydrogen bonding, ionic attraction, van der Waals forces, hydrophobic interactions, etc.

In one embodiment, cyclodextrins act as the host molecule 12. Cyclodextrins are cyclic oligosaccharides. In various embodiments, the cyclodextrins used herein are α-, β- and γ-cyclodextrin consisting of six, seven, and eight glucopyranose units, respectively. The properties of these cyclodextrins are provided in Table 1.

TABLE 1

Properties of Selected Cyclodextrins

|  | α | β | γ |
|---|---|---|---|
| Molecule weight (g/mol) | 972 | 1135 | 1297 |
| Glucose Monomers | 6 | 7 | 8 |
| Internal cavity diameter (Å) | ~5.7 | ~6.3 | ~7.9 |
| Water solubility (g/100 mL, 25° C.) | 14.2 | 18.5 | 23.2 |
| Melting Point (° C.) | ~255 | ~265 | ~245 |
| Cavity volume (mL/mol) | 174 | 262 | 462 |

Figures 2A, 2B:
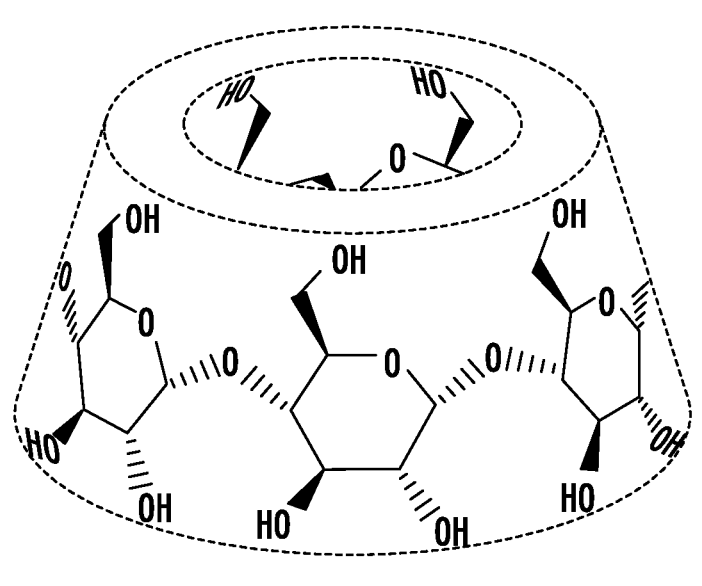
FIGS. 2A-2B depict an $\alpha$-cyclodextrin host molecule according to an exemplary embodiment.
Figures 3A, 3B:
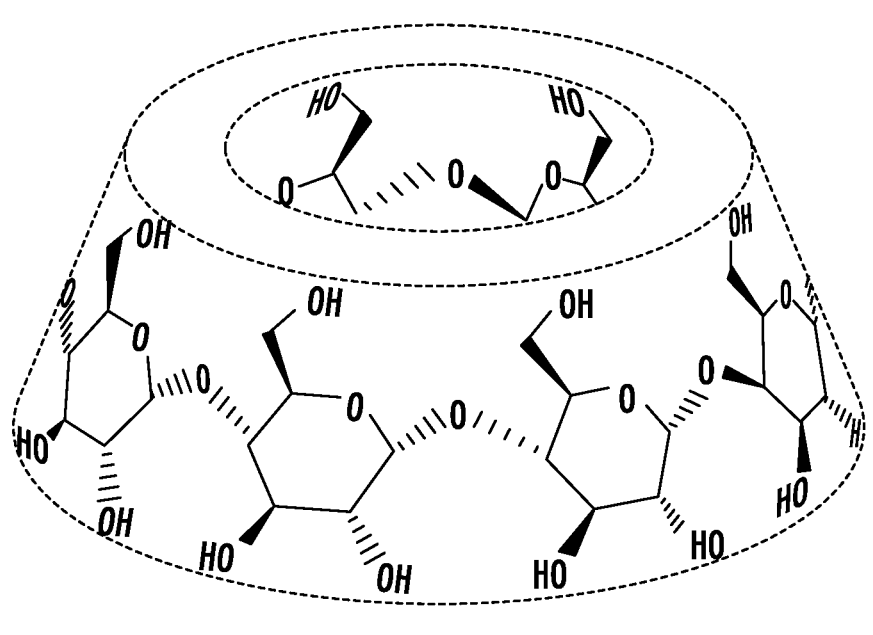
FIGS. 3A-3B depict a $\beta$-cyclodextrin host molecule according to an exemplary embodiment.
Figures 4A, 4B:
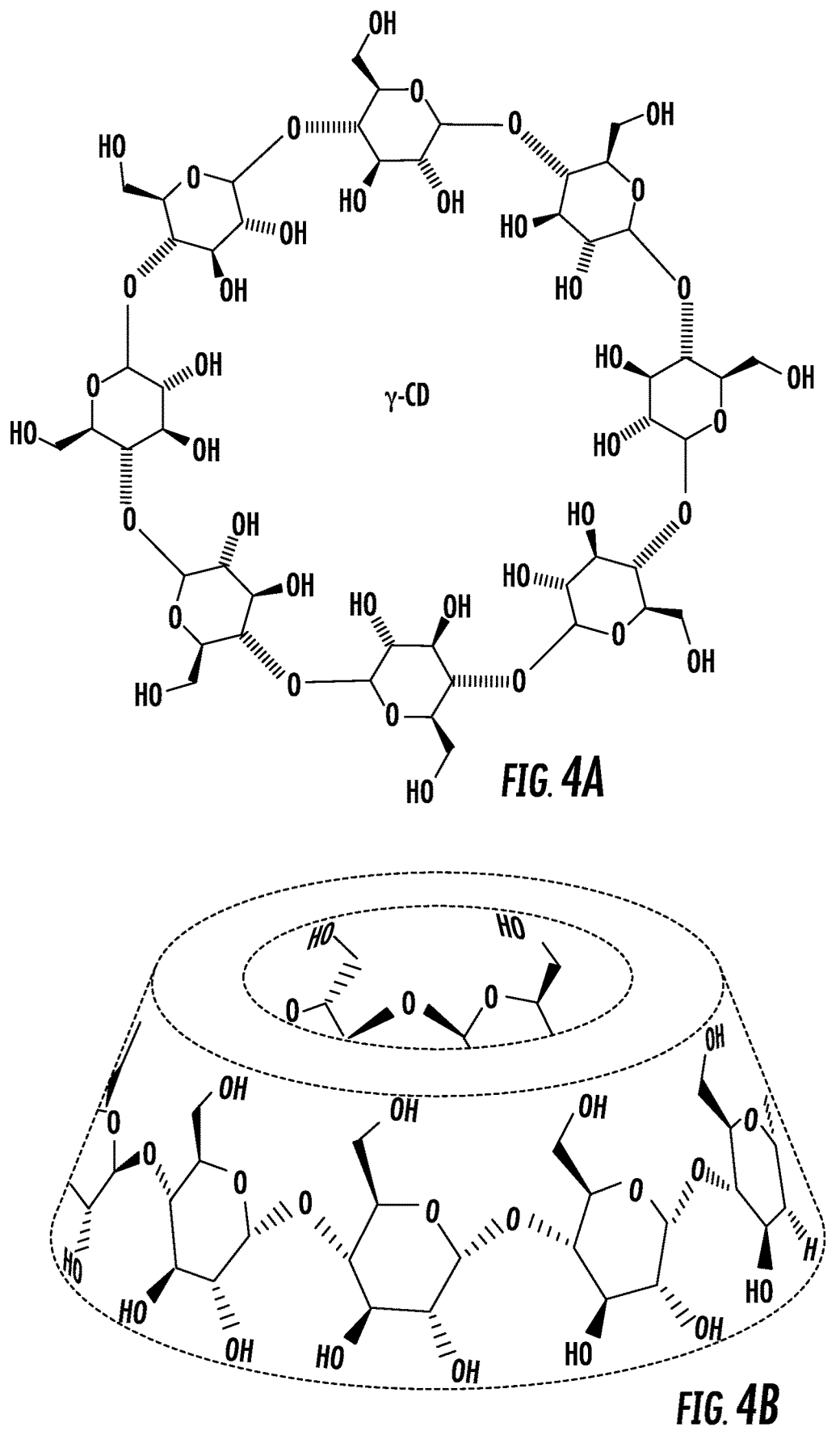

Structurally, a cyclodextrin molecule consists of (α-1,4)-linked α-D-glucopyranose units. FIG. 2A provides a line angle formula for α-cyclodextrin; FIG. 3A provides a line-angle formula for β-cyclodextrin; and FIG. 4A provides a line-angle formula for γ-cyclodextrin. Because the glucopyranose units exhibit the chair conformation, each cyclodextrin molecule is shaped like a truncated cone having a central cavity. The truncated cone shape can be seen in FIGS. 2B, 3B, and 4B, which demonstrate that the width of the cone expands as the cyclodextrin molecule grows with additions of glucopyranose units. The central cavities of cyclodextrin molecules are somewhat lipophilic and hydrophobic, and the outer surface is hydrophilic. The hydroxyl functional groups are orientated to the cone exterior such that the primary hydroxyl groups of the each glucopyranose unit (found at the fifth carbon) are located at the narrow edge of the cone and the secondary hydroxyl groups (located at the second and third carbons of each glucopyranose unit) are located at the wider edge. The central cavity is lined by the skeletal carbons and ethereal oxygens of the glucopyranose units, giving the central cavity of cyclodextrin its lipophilic/hydrophobic character.

The cyclic nature of cyclodextrin allows for other molecules, i.e., guest molecules, to enter its central cavity. Because of cyclodextrin's hydrophobic central cavity, it will readily form complexes with other hydrophobic guest molecules. Additionally, because cyclodextrin forms a variety of ring sizes, inclusion complexes between cyclodextrin and a variety differently sized molecules can be created.

While α-, β-, or γ-cyclodextrins are utilized in certain embodiment, a variety of other host molecules can also be utilized, such as cyclodextrins larger than γ-cyclodextrins, chemically modified derivatives of the cyclodextrin (such as hydroxypropyl-modified cyclodextrin and methyl-modified cyclodextrin), calixarene (having any number of repeat units), chemically modified derivatives of calixarene, zeolites, chibaite, urea, thiourea, hydroquinone, and 4-p-hydroxyphenyl-2,2,4-trimethylchroman (Dianin's compound). Host molecules consisting of urea, thiourea, and hydroquinone form hydrogen-bonded networks that are capable of accommodating guest molecules. Selection of the host molecule can be done to alter the polarity of the inclusion complex such that the inclusion complex can be tailored to disperse in a variety of different media types.

As discussed above, the guest molecule is a polyoxometalate (POM) that has been modified with an ionic liquid (IL). Regarding the POM, the POM makes the charring/carbonization process of the flame retardant additive faster and more efficient by catalyzing the charring process. In particular, the POM helps to create a denser char residue, thereby enhancing flame retardance. Exemplary POM for use in the PIL have the structure of three or more transition metal oxyanions linked together by shared oxygen atoms to form a large, closed three-dimensional framework. In embodiments, the metal atoms are generally selected from, but are not limited to, group 5 or group 6 transition metals, such as vanadium (V), niobium (V), tantalum (V), molybdenum (VI), and tungsten (VI). In certain embodiments, the POM is selected for its smoke suppressant properties. In specific smoke suppressant embodiments, the smoke suppressant contains molybdenum or zinc.

Specific POM anions suitable for use as the PIL include $[PW_{12}O_{40}]^{3-}$, $[PMo_{12}O_{40}]^{3-}$, $[SiW_{12}O_{40}]^{4-}$, $[SiMo_{12}O_{40}]^{4-}$, $[BW_{12}O_{40}]^{3-}$, $[BMo_{12}O_{40}]^{3-}$, $[AsW_{12}O_{40}]^{5-}$, $[AsMo_{12}O_{40}]^{5-}$, $[GeW_{12}O_{40}]^{4-}$, $[GeMo_{12}O_{40}]^{4-}$, $[PMo_9V_3O_{40}]^{5-}$, $[PMo_{10}V_2O_{40}]^{5-}$, $[PMo_{10}VO_{40}]^{4-}$, $[P_2W_{18}O_{62}]^{6-}$, $[P_2Mo_{18}O_{62}]^{6-}$, $[As_2W_{18}O_{62}]^{6-}$, $[As_2Mo_{18}O_{62}]^{6-}$, $[W_6O_{19}]^{2-}$, $[Mo_6O_{19}]^{2-}$, $[V_6O_{19}]^{8-}$, $[Nb_6O_{19}]^{8-}$, among others. Further, in other embodiments, a variety of molybdenum-containing POM may be used as the guest molecule, including, but not limited to, molybdenum trioxide, ammonium octamolybdate, molybdenum acetate $[Mo_2(acetate)_4]$, molybdenum dialkyldithiocarbamate, calcium and zinc molybdates, and other organo-molybdenum and/or molybdenum-containing compounds.

Regarding the IL, in embodiments, the IL includes a cation based on, e.g., ammonium, imidazolium, guanidinium, pyridium, morpholinium, pyridazinium, 1,2,4-triazolium, triazine, sulfonium, phosphazenium, or phosphonium and an anion based on, e.g., sulfates, sulfonates, phosphates, borates, etc. Eexemplary IL suitable for forming the PIL include 1-ethyl-3-methyl-imidazolium ethylsulfate, 1-butyl-3-methylimidazolium hexafluorophosphate, 1-butyl-3-methylimidazolium tetrafluoroborate, 1-hexyl-3-methylimidazolium hexafluorophosphate, 1-butyl-3-methyl-imidazolium bis(trifluoromethanesulfonyl)imide, 1-ethyl-3-methylimidazolium trifluoromethanesulfonate, scandium (III) trifluoromethanesulfonate, praseodymium (III) trifluoromethanesulfonate, 1,3-dialkyl-1,2,3-triazolium hexafluorophosphate, 1,3-dialkyl-1,2,3-triazolium bis(trifluoromethanesulfonyl)imide, and 1,2,4-trimethylpyrazolium methylsulfate, among others. Generally, salts containing imidazolium cation, quaternary cationic scales, cationic pyrrole, and/or pyrazole cation are suitable ionic liquids for use in the PIL. A variety of other ionic liquids suitable for use in the present invention are disclosed in U.S. Publication No. 2011/0073331 (application Ser. No. 12/947,377, filed on Nov. 16, 2010), the entire contents of which are incorporated herein by reference thereto.

Before forming the inclusion complex, the POM and IL are reacted to produce the PIL. In embodiments, the PIL are formed through acid/base reactions or through ion-exchange reactions. For example, in an ion-exchange reaction, the IL and salts of the POM are placed in a solvent, such as water, and the cation of the IL will attach to the POM anion to form the PIL. The PIL is then removed from the solvent.

Figures 5A, 5B, 5C:
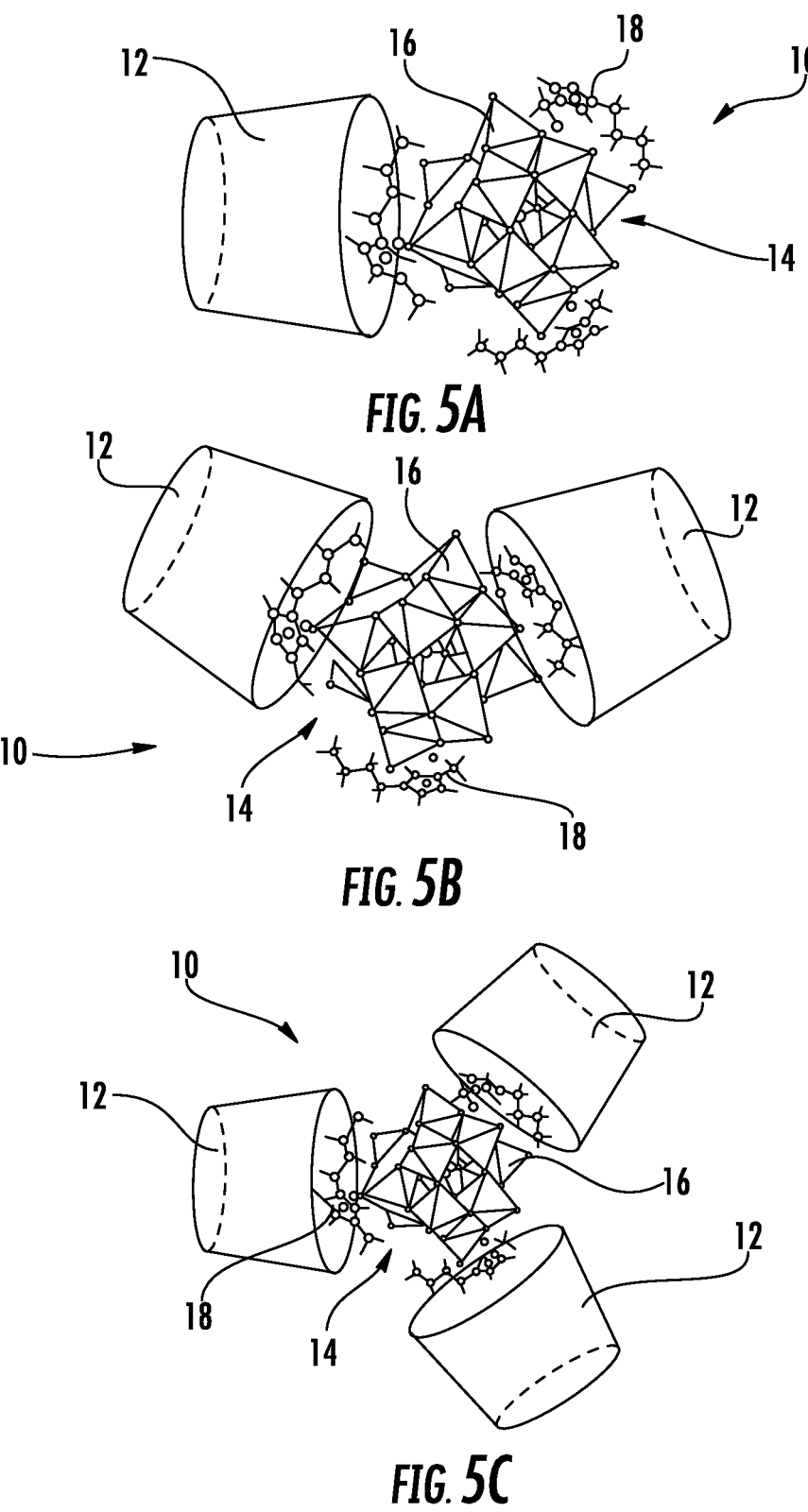
FIGS. 5A-5C depict a $\beta$-cyclodextrin and ionic liquid modified octamolybdate partial and full inclusion complexes, according to an exemplary embodiment.

Upon obtaining the PIL, the inclusion complex comprised of the PIL guest molecule and the carbonific host molecule can be formed. In this regard, insertion of the guest molecule into the host molecule does not involve a chemical reaction, i.e., no covalent bonds are broken or formed. Instead, the reaction is purely a physical association based on molecular attraction. In embodiments, the inclusion complexes are formed by dissolving stoichiometric amounts of the host molecule and the guest molecule in a solvent. For example, with reference to FIG. 5A, the host molecule and guest molecule have been added to the solvent at a ratio CD:PIL of 1:1. However, as shown in FIGS. 5B and 5C, the host molecule and guest molecule can also be added to the solvent at ratios CD:PIL of, e.g., 2:1 and 3:1, respectively. Indeed, the ratio of CD:PIL for the particular host molecule (β-cyclodextrin) and guest molecule (1-butyl-3-methylimidazolium phosphomolybdate) can react at ratios of greater than 0 and up to 3 (i.e., CD:PIL of >0:1 to 3:1).

By forming inclusion complexes, the individual host and guest molecules are substantially prevented from aggregating during compounding of a thermoplastic compound because one or more of the host molecules are already matched with a guest molecule. Additionally, the complexes help to overcome additive insolubility. For instance, a hydrophobic guest molecule can be inserted into a host molecule that has a hydrophobic cavity and a hydrophilic exterior, such as cyclodextrin. The hydrophilic exterior will allow the complex to dissolve in a hydrophilic solvent, thereby facilitating the dissolution of an otherwise insolvent, hydrophobic guest molecule into a hydrophilic solvent. Further, the close proximity encourages more rapid reaction kinetics within the compounded thermoplastic material when exposed to heat and/or fire.

In another aspect, the LSZH flame retardant or intumescent system can be compounded with a base polymer to create a thermoplastic LSZH flame retardant compound. The thermoplastic LSZH flame retardant compound can be deployed through a variety of means, including paints, sprays, dip coatings, jacketing materials, wrappers, etc.

In various embodiments, the thermoplastic compound is based on a thermoplastic polymer. More specifically, the thermoplastic compound is based on a polyolefin homopolymer or copolymer resin. Suitable polyolefin resins include single polymers or a blend of polymers selected from the following types: ethylene-vinyl acetate copolymers, ethylene-acrylate copolymers, polyethylene homopolymers (includes but not limited to low density, medium density, and high density), linear low density polyethylene, very low density polyethylene, polyolefin elastomer copolymer, polypropylene homopolymer, polyethylene-polypropylene copolymer, butene- and octene branched copolymers, or maleic anhydride-grafted versions of the polymers listed above. Selection of the polymer depends primarily on the application to which the thermoplastic flame retardant compound is going to be subjected. In another embodiment, the base resin could be a halogenated thermoplastic (such as polyvinyl chloride); polyamide 6, 6/6, 11, or 12 resins; thermoplastic polyurethane; or a crosslinked polyethylene.

In embodiments, the LSZH flame retardant additive contains other flame retardant components, such as metal hydrates, gas-forming species or combinations of species (e.g., melamine and its derivatives, etc.), char strength boosters, etc. In an exemplary embodiment, the flame retardant additive includes an additional carbonific source, an acid donor, and/or a spumific agent. Exemplary carbonific sources include polyols (e.g., pentaerythritol, xylitol, mannitol, and d-sorbitol), starch, and/or polyamide-6. Exemplary acid donors include ammonium polyphosphate, diammonium diphosphate, and/or diammonium pentaborate. An exemplary spumific agent is melamine; although, ammonium-containing compounds can also be used as spumific agents in embodiments.

Further, in embodiments, the inclusion complexes can be dispersed in a synergist carrier. A synergist carrier is an inorganic compound, such as a zeolite, a clay, a bentonite, and/or zinc borate, among others, that operates with the inclusion complexes to enhance flame retardance and/or smoke suppression of the flame retardant additive. The synergist carrier can do so in a variety of ways, including, for example, forming a ceramic layer in or on the char layer/foam, releasing water when decomposed to dilute the combustible gases and/or to suppress smoke, thermally insulating the polymer compound, functioning as an anti-dripping agent, and/or, together with the inclusion complexes, promoting the function (e.g., the catalytic effect) on the charring process of the flame retardant additive.

Various proportions of each component can be used in formulating the thermoplastic flame retardant compound. In a particular embodiment, the inclusion complex is from 0.1 wt % to 15 wt % of the thermoplastic flame retardant compound. In a more particular embodiment, the inclusion complex is from 0.5 wt % to 5 wt % of the thermoplastic flame retardant compound. In another particular embodiment, the entire flame retardant additive (e.g., including other carbonifics, acid donors, spumific agents, synergists, etc.) is from 5 wt % to 60 wt % of the thermoplastic flame retardant compound. In a more particular embodiment, the flame retardant additive is from 20 wt % to 40 wt % of the thermoplastic flame retardant compound. Additionally, while the weight percentage of the inclusion complex in the thermoplastic flame retardant compound will depend, at least to some extent, on the weights of the specific host and guest molecules, the amount of the PIL guest molecules is from 0.1 wt % to 10 wt % in some embodiments.

Further, in embodiments, the thermoplastic compound may also include non-flame retardant additives such as mineral fillers (talc, calcium carbonate, etc.), antioxidants, UV additives, processing modifiers, compatibilizers, and other standard polymer additives.

The base resin, LSZH flame retardant additive, and all other additives are compounded together using elevated temperatures, such as from about 140° C. to 220° C. or higher, and sufficient shear, such as at shear rates from $10\,\mathrm{s}^{-1}$ to $10,000\,\mathrm{s}^{-1}$, to distribute the components. In a particular embodiment, the shear rate for mixing is between $50\,\mathrm{s}^{-1}$ and $500\,\mathrm{s}^{-1}$. Sufficient shear mixing can be achieved through use of such mixing equipment as a co-rotating twin screw extruder, a single screw extruder with mixing zones, a Banbury-style rotary mixer, Buss kneader, or another high-shear mixer. Advantageously, the molecular level interaction between the host and guest molecules allows for high shear mixers to be used at a level where the risk of degradation to the polymer is substantially diminished while still providing excellent dispersion of the flame retardant additive.

Example

FIGS. 5A-5C provide exemplary depictions of an inclusion complex having β-cyclodextrin as the host molecules and 1-butyl-3-methylimidazolium phosphomolybdate as the PIL guest molecule. The PIL was formed through a 1:1 molar ratio ion-exchange reaction of 1-butyl-3-methylimidazolium chloride and ammonium phosphomolybdate in water. During the reaction, the 1-butyl-3-methylimidazolium cation attaches to the phosphomolybdate anion, and the other reaction product of $NH_4Cl$ can be washed away.

The inclusion complex is then formed by dissolving 11.4 g β-cyclodextrin in a 100 mL of solvent comprised of 85 mL water and 15 mL acetone. The acetone was added to increase the solubility of the β-cyclodextrin. The PIL of 1-butyl-3-methylimidazolium phosphomolybdate was then added to form the inclusion complexes.

A batch (PP-IC) was compounded including 1 wt % of the β-CD/PIL inclusion complex, 19 wt % of a flame retardant mixture of ammonium polyphosphate (APP) and pentaerythritol (PER) with APP:PER of 2:1, and the balance of polypropylene polymer (Pro-fax PH835, available from LyondellBasell). Additional batches for the purpose of comparison were also compounded. One comparison batch (PP) was made of pure polypropylene, and another comparison batch (PP control) was made of polypropylene mixed with 20 wt % APP/PER with APP:PER of 2:1. All batches were compounded using a twin screw extruder (34 mm Twin Screw Extruder, available from Leistritz Extrusionstechnik GmbH) according to the processing conditions shown in Table 2. Additionally, all samples were then injection molded (using an Allrounder 370C injection molding machine, available from Arburg GmbH & Co. KG) into test samples with a processing condition as shown in Table 3.

TABLE 2

Compounding Conditions for Flame Retardant Compound

| | |
|---|---|
| Screw Speed (RPM) | 100 |
| Single Feeder (kg/hr) | 2.25 |
| Twin Screw Feeder (g/min) | 9.4 |
| Zone 1 (° C.) | n/a |
| Zone 2 (° C.) | 150 |
| Zone 3 (° C.) | 180 |
| Zone 4 (° C.) | 180 |
| Zone 5 (° C.) | 160 |
| Zone 6 (° C.) | 160 |
| Zone 7 (° C.) | 160 |
| Zone 8 (° C.) | 160 |
| Zone 9 (° C.) | 160 |
| Zone 10 (° C.) | 160 |
| Die Temp (° C.) | 150 |
| Torque (amps) | 9.1 |
| Vacuum (in/hg) | 5 |

TABLE 3

Injection molding conditions

| | |
|---|---|
| Gate Temp (° C.) | 170 |
| Mold Temp Moving Half (° F.) | 100 |
| Mold Temp Fixed Half (° F.) | 100 |
| Temp Zone 1 (° C.) | 170 |
| Temp Zone 2 (° C.) | 180 |
| Temp Zone 3 (° C.) | 190 |
| Temp Zone 4 (° C.) | 200 |
| Temp Zone 5 (° C.) | 200 |
| Dosage Volume (ccm) | 20.5 |
| Holding Pressure Bar Base 1 (Bar) | 900 |
| Holding Time (s) | 3 |
| Step 1: Injection Flow (ccm/s) | 60 |
| Actual Bar Pressure (Bar) | 900 |
| Switch Over Point | 1.65 |
| Actual Switch Over Pressure (Bar) | 1097-1180 |
| Cooling (s) | 10 |

Figure 6:
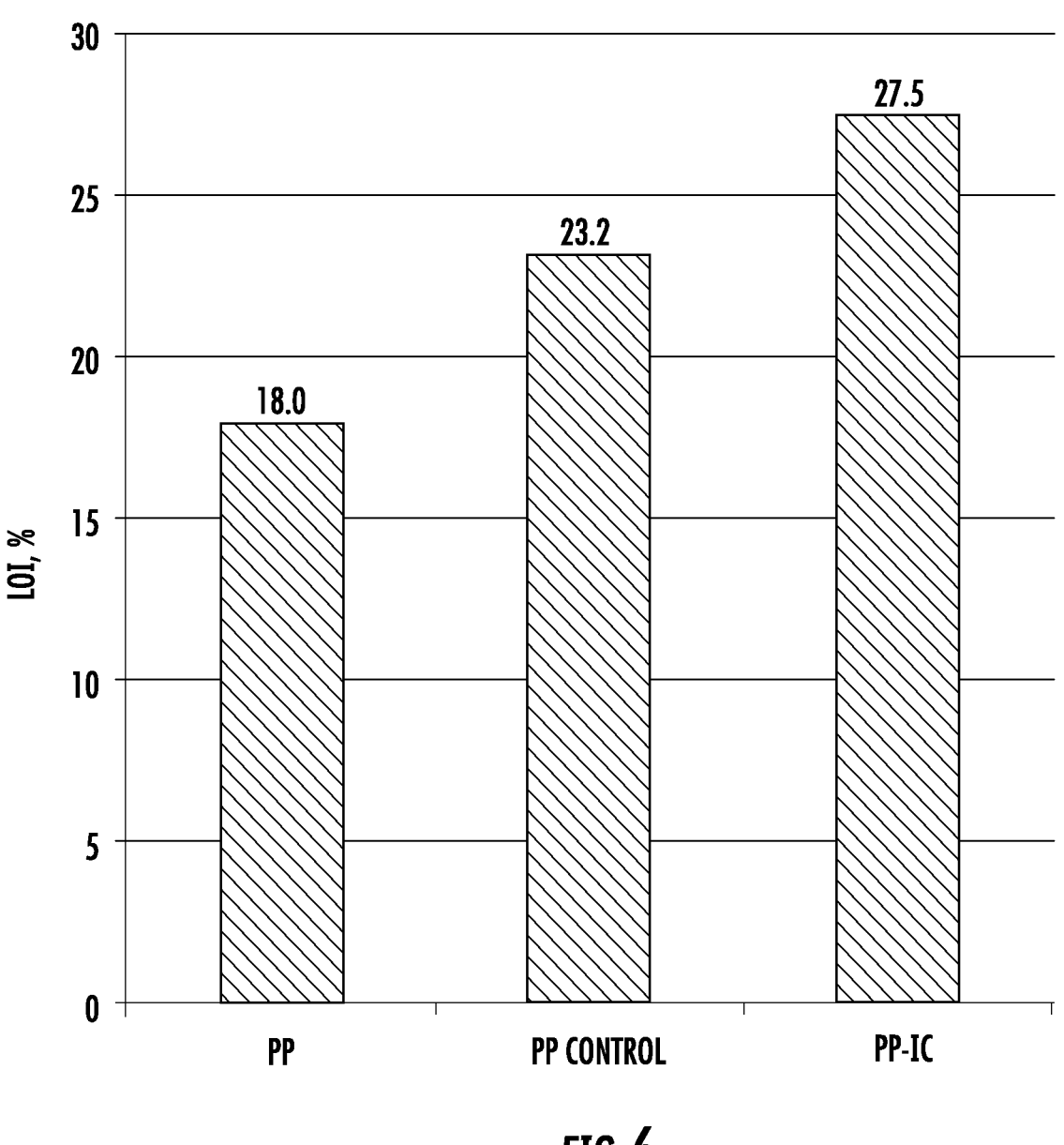
FIG. 6 depicts a graphical representation of the limiting oxygen index of three samples, including a sample containing an inclusion complex, according to an exemplary embodiment.

A visual combustion test was first performed on the PP control and the PP-IC samples. The test involved burning the samples with a propane torch under a hood. The PP control sample exhibited more extensive burning along its length whereas the PP-IC developed a more extensive char layer and less burning along its length. The samples were then tested to determine their limiting oxygen index (LOI) in accordance with standard ISO 4589, including general requirements as specified in ISO 4589-1:2017 and further described in ISO 4589-2:2017 and ISO 4589-3:2017, the contents of ISO 4589 being incorporated herein by reference. As shown in FIG. 6 and as recorded in Table 4, below, the PP-IC sample had an LOI of 27.5%, whereas the PP and PP control samples had an LOI 18.0% and 23.2%, respectively.

TABLE 4

Composition and Flame Retardant Performance of Test Samples

| Samples | PP (wt %) | APP/PER (wt %) | CD-PIL (wt %) | LOI (%) | UL-94 | Dripping |
|---|---|---|---|---|---|---|
| PP | 100 | 0 | 0 | 18.0 | NR | Yes |
| PP control | 80 | 20 | 0 | 23.2 | NR | Yes |
| PP-IC | 80 | 19 | 1 | 27.5 | V0 | No |

Finally, the samples were tested to determine their UL-94 flammability rating, which evaluates burning/afterglow times as well as dripping during the test. The test involves applying a flame to the end of a vertically hanging sample ten times for a period of ten seconds each time. After each ten second flame application, the time over which the sample burns after the flame is removed is recorded. Additionally, the sample is observed to determine whether any material drips from the sample and/or ignites the dripping collection material. The highest rating is V-0, which indicates that the sample burned for ten seconds or less after each flame application, the sample burned less than fifty seconds total after all ten flame applications, the sample exhibited burning and afterglow of less than thirty seconds after two flame applications, the sample did not drip, and the sample was not completely burned. As shown in Table 4, above, the PP-IC sample achieved a UL-94 rating of V-0, non-dripping, while the PP sample and the PP control sample were not able to achieve a UL-94 rating and exhibited dripping.

Advantageously, embodiments of the disclosed inclusion complexes allow for more efficient and effective use of the flame retardant compounds. For instance, the higher utilization of the flame retardant components as a result of decreased aggregation decreases the amount of flame retardant material that is necessary to achieve a given flame retardant performance. Accordingly, raw material costs are reduced. Alternatively, the same amount of fire retardant material could be used while increasing the flame retardant performance, which would improve the burn performance rating.

Figure 7:
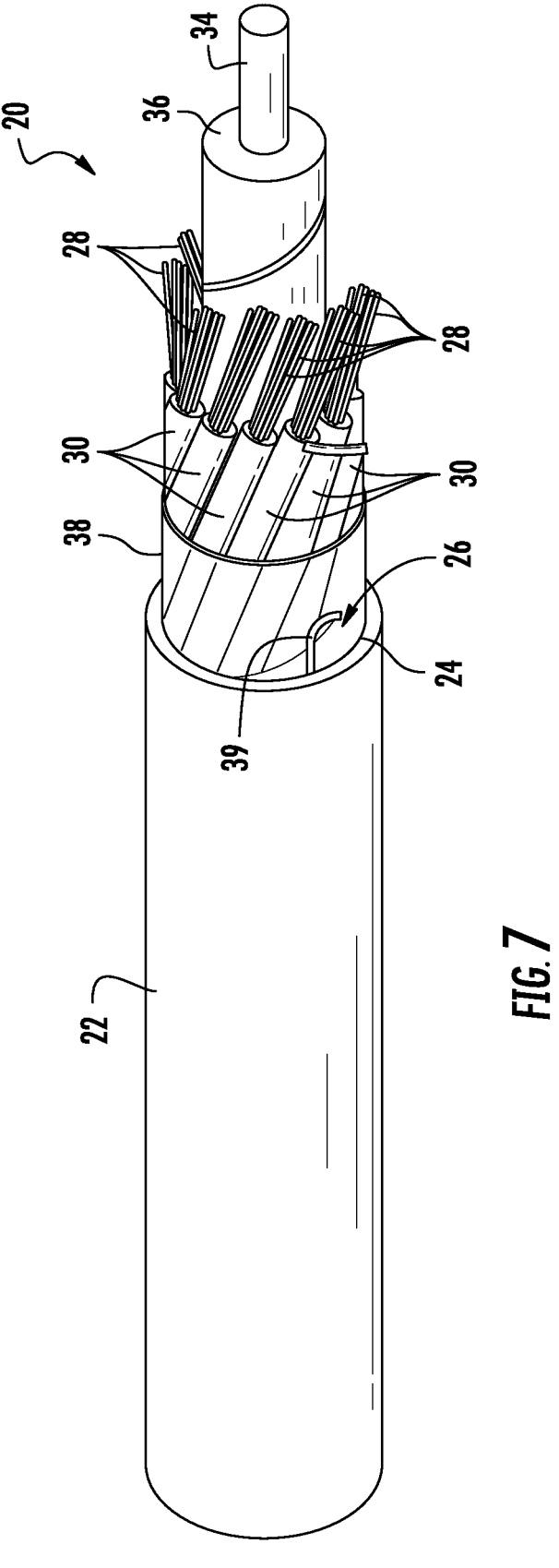
FIG. 7 depicts a cable including a flame retardant material according to an exemplary embodiment.

The flame retardant thermoplastic compound as described herein can be used for a variety of applications. In embodiments, the thermoplastic LSZH flame retardant compound is used as jacketing for cables, such as electrical communication cables, optical communication cables, etc. In a particular embodiment as shown in FIG. 7, the thermoplastic LSZH flame retardant compound is shown as part of an optical fiber cable 20. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the thermoplastic LSZH flame retardant compound is incorporated into the cable jacket 22 of fiber optic cable 20. In another embodiment, the thermoplastic LSZH flame retardant compound is incorporated into the buffer tubes 30 surrounding the bundles of optical fibers 28. In a further embodiment, the thermoplastic LSZH flame retardant compound is incorporated into the water barrier 38. By surrounding the cable and cable components with the thermoplastic LSZH flame retardant compound, the ability of fire to spread along cable 20 is reduced, and the amount of smoke produced by cable 20 during fire exposure is reduced.

The inventors envision that cables incorporating the thermoplastic LSZH flame retardant compound discussed above will pass certain flame retardant standards, such as cone calorimeter reaction-to-fire test ISO 5660; single cable test IEC 60332-1-2; vertical multi cable test DIN 50399/IEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A flame retardant compound comprising:
   a polymer base resin;
   a synergist; and
   a flame retardant additive distributed within the polymer base resin, the flame retardant additive including inclusion complexes, wherein each inclusion complex comprises:
      at least one guest molecule, wherein each of the at least one guest molecules is a polyoxometalate ionic liquid; and
      at least one carbonific host molecule; and
   wherein the flame retardant compound achieves a limiting oxygen index of at least 25% according to ISO 4589;
   wherein the flame retardant compound is comprised of from 0.1 to 15 wt % of the inclusion complexes; and
   wherein the synergist comprises at least one of zeolite or zinc borate.

2. The flame retardant compound of claim 1, wherein the polyoxometalate ionic liquid includes polyoxometalate anions containing molybdenum.

3. The flame retardant compound of claim 2, wherein the polyoxometalate anion is derived from at least one of molybdenum trioxide, ammonium octamolybdate, ammonium phosphomolybdate, molybdenum acetate, calcium molybdate, zinc molybdate, or molybdenum dialkyldithiocarbamate.

4. The flame retardant compound of claim 1, wherein the polyoxometalate ionic liquid is formed from an ionic liquid including at least one based on an ammonium, an imidazolium, a guanidinium, a pyridium, a morpholinium, a pyridazinium, a 1,2,4-triazolium, a triazine, a sulfonium, a phosphazenium, or a phosphonium and an anion based on a sulfate, a sulfonate, a phosphate, or a borate.

5. The flame retardant compound of claim 1, wherein the at least one carbonific host molecule is a cyclodextrin.

6. The flame retardant compound of claim 5, wherein the cyclodextrin is at least one of alpha, beta, gamma, or larger cyclodextrins.

7. The flame retardant compound of claim 5, wherein the cyclodextrin is a chemically modified derivative of cyclodextrin.

8. The flame retardant compound of claim 1, wherein the at least one carbonific host molecule is at least one of calixarene or chemically modified derivatives of calixarene, zeolites, chibaite, urea, thiourea, hydroquinone, or 4-p-hydroxyphenyl-2,2,4-trimethylchroman.

9. The flame retardant compound of claim 1, wherein the base resin includes at least one of ethylene-vinyl acetate copolymers; ethylene-acrylate copolymers; low, medium, and high density polyethylene homopolymers; linear low density polyethylene; very low density polyethylene; polyolefin elastomer copolymer; polypropylene homopolymer; polyethylene-polypropylene copolymer; butene- and octene branched copolymers; maleic anhydride-grafted versions of the previously listed polyolefins; polyvinyl chloride; polyamide 6; polyamide 6/6; polyamide 11; polyamide 12; thermoplastic polyurethane; or crosslinked polyethylene.

10. The flame retardant compound of claim 1, wherein the flame retardant additive further includes at least one of a metal hydrate, a char strength booster, a synergist, or a gas-forming compound.

11. The flame retardant compound of claim 1, wherein the flame retardant additive further includes a carbonific source in addition to the at least one carbonific host molecule, an acid donor, and a spumific agent.

12. The flame retardant compound of claim 11, wherein the carbonific source is at least one of a polyol, a starch, or polyamide-6.

13. The flame retardant compound of claim 11, wherein the acid donor is at least one of ammonium polyphosphate, diammonium diphosphate, or diammonium pentaborate.

14. The flame retardant compound of claim 11, wherein a single compound is both the acid donor and the spumific agent.

15. The flame retardant compound of claim 1, wherein the ratio of carbonific host molecule to polyoxometalate anion of the polyoxometalate ionic liquid is more than 0 and less than or equal to 3.

* * * * *